June 20, 1967 W. B. ALLEN ET AL 3,327,214
ELECTRONIC CURRENT METER HAVING LINEAR RESPONSE
Filed March 26, 1964

WALLACE B. ALLEN
FLOYD E. BLOUNT
ALVIN V. METLER
INVENTORS

BY Emil J. Bednar
ATTORNEY

WALLACE B. ALLEN
FLOYD E. BLOUNT
ALVIN V. METLER
INVENTORS

BY Emil J. Bednar
ATTORNEY

United States Patent Office 3,327,214
Patented June 20, 1967

3,327,214
ELECTRONIC CURRENT METER HAVING LINEAR RESPONSE
Wallace B. Allen, Floyd E. Blount, and Alvin V. Metler, Dallas, Tex., assignors to Mobil Oil Corporation, a corporation of New York
Filed Mar. 26, 1964, Ser. No. 354,835
10 Claims. (Cl. 324—123)

This invention relates to an electronic meter, and more particularly to one used in procedures for determining the current requirements for cathodic protection of well casing and the like.

The current required for the cathodic protection of well casing and the like can be determined by the polarization curve method. In this method, cathodic currents are applied to the well casing in discreet increments. At each current increment, the current is momentarily interrupted and the casing-to-soil polarization potential, with respect to a reference electrode placed in the earth some distance from the wellhead, is determined. The differences between these measured polarization potentials with each increase in current are normally of the order of a few millivolts. The measured potentials are plotted against the applied currents or, preferably, the logarithms of the applied currents. The plot is a curve which is graphically representative of the concentration and activation polarizations in the well casing produced by the applied current. The proper cathodic protective current is assumed to be that current intercept of this curve where the straight portion of the curve representative of the cathodic activation polarization intersects with the curvature that is representative of both anodic and cathodic polarization.

In order to obtain reliable curves from which the amount of cathodic current required to protect a well casing can be determined, the polarization potential must be measured to an accuracy of ±0.002 volt D.C. This potential also must be measured within a few seconds before it decays and without any significant current flow between the well casing and reference electrode. Certain laboratory type vacuum tube voltmeters can provide suitable measurements of the polarization potentials. These meters are very delicate and rather expensive. However, the measurement of the polarization potentials is not performed under ideal or laboratory conditions. The measurement of these potentials must be made under severe field conditions at each well casing which needs to be protected by application of cathodic currents. Therefore, a portable meter that is rugged but yet suitably sensitive for measuring the polarization potential is required. Prior to this invention, no battery-powered meter was found sufficiently rugged for field use that produced the necessary sensitivity measurement of potential for plotting suitable curves from which the current required for cathodic protection of well casing could be determined. It is therefore an object of this invention to provide an electronic meter that is portable and suitably sensitive but yet sufficiently rugged to be useful in the field at the location of a well casing to be surveyed for current required for its cathodic protection. Another object is to provide an electronic meter having a very high input impedance, a sensitivity and reproducibility of measurement to within ±0.002 volt D.C. and a fabrication from standard electrical components. Another object is to provide for an electronic meter for use in procedures in determining the current required for the cathodic protection of well casing and the like.

These and further objects will be more apparent when read in conjunction with the following detailed description, the appended claims, and the attached drawings in which:

Figure 1:
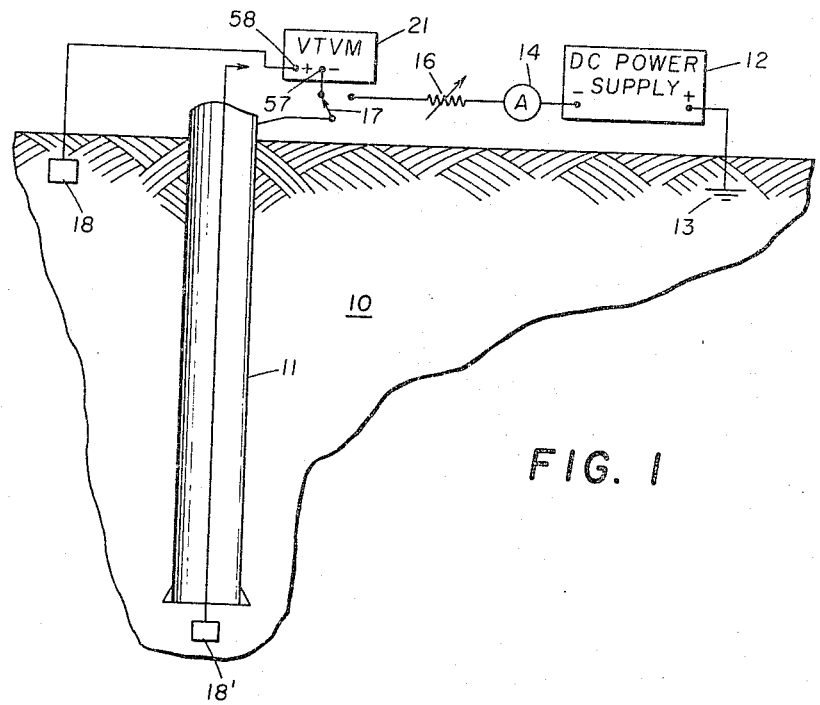
FIGURE 1 is a vertical section through the earth showing a well casing connected to circuitry used in a procedure for determining the current required for its cathodic protection.

Referring now to FIGURE 1, a detailed description of the polarization curve method for determining the current required for the cathodic protection of well casing and the like will be given as a means of assisting the reader to understand the problems surrounding the accurate measurement of potentials in the field. Disposed within the earth 10 is a ferrous structure, like well casing 11, for which the current required for its cathodic protection is to be determined. Means are provided for applying a unidirectional current flow between the earth 10 and the casing 11. These means may be of any form. For example, the means can be a power supply 12 in a circuit connected between the casing 11 at the surface of the earth 10 and a suitable ground bed 13 disposed in the earth 10 at a distance from the casing 11. The power supply 12 may be of any suitable construction adapted to provide a direct current output. A D.C. generator driven by suitable prime mover may be utilized as the power supply 12. The ground bed 13 may be spaced any distance greater than about 50 feet from the well casing 11. Practical considerations usually dictate that the ground bed 13 be placed between 50 and 600 feet from the well casing 11. Preferably, the ground bed 13 is placed in the same area as will be the permanent anode used in cathodically protecting the casing 11. Several pieces of 3-inch by 60-inch scrap pipe buried in damp soil within the earth 10 provide a satisfactory construction for the ground bed 13.

The mentioned circuit may include with the power supply 12, an ammeter 14 and a variable resistance 16 for ready regulation of current flow to the casing 11. The current is applied selectively through a means such as a single-pole double-throw switch 17 to the casing 11. Obviously, the variable resistance 16 allows the amount of current flowing from the power supply 12 between the ground bed 13 and the casing 11 to be regulated. This current flow may be interrupted at will be means of the switch 17.

The current flow produces a polarization effect which may be readily monitored by measuring the polarized potential present between the casing 11 and a suitable reference electrode 18. Any reference electrode may be used; however, it is preferred to use the copper-copper sulfate electrode well known to those skilled in the art. The electrode 18 is disposed within the earth 10 and preferably spaced from the casing 11 on a side opposite from the ground bed 13. The electrode 18 may be placed any distance from the casing 11 adjacent the surface of the earth 10. It is commonly disposed between 10 and 1000 feet from the casing 11. However, if desired, a reference electrode may be disposed below the bottom of the casing 11 as indicated by the electrode 18'. For this purpose, however, the electrode 18' should be constructed to withstand the conditions present at such depth in the earth 10.

The electronic meter of this invention, designated by the numeral 21, is connectable through the switch 17, when in the first position, to measure the polarized potential between the reference electrode 18 and the casing 11 with the flow of current from the power supply 12 interrupted. Obviously, the switch 17, when in the second position, provides for current flow between the ground bed 13 and the casing 11.

Current for effecting polarization is passed to the casing 11 from the power supply 12. After a period of time, the current flow is interrupted and the casing 11 is connected through the switch 17 to the meter 21. The potential difference between the casing 11 and the electrode 18 is quickly measured before any significant decay occurs. As soon as possible after such measurement, the current flow is resumed but increased by a given increment. The current flow is continued for the same period of time, then interrupted and the potential measured on the meter 21. The current is then increased again by a fixed increment and the operation repeated as before. The magnitude of each current increase is not critical. However, the current applied is usually increased in equal increments of about 10 percent of the estimated requirements of current for protecting the casing 11. For any situation, the current is applied for a period whose duration depends on the magnitude of the current flow. The minimum time recommended is 3 minutes for any current flow up to 0.3 ampere. For larger current flows, the minimum time, in minutes, recommended is ten times the current flow in amperes. For example, good results are obtained with a current flow of 0.4 of an ampere for each increment increase and a time interval of 5 minutes for each application. The time required for measuring the potential with the meter 21 between the casing 11 and the electrode 18 should not be of any significant duration. For example, the time of current interruption for measuring the polarized potential should not exceed 5 to 8 seconds.

The system shown in FIGURE 1 was used to practice the polarization curve method for determining the current required for cathodic protection of a well casing in the field. The flow of current was successively applied in 0.4 ampere increments. Time interval of current flow between interruptions was 5 minutes. The potentials measured by the meter 21 were plotted at each increased current flow to produce the curve A shown in FIGURE 2. The curve A is comprised of two substantially straight portions 22 and 23 interconnected by a curvature 24. The lower straight portion 22 is produced by anodic and cathodic polarization in the casing 11 by applications of current flow less than about 3.0 amperes. The straight portion 23 is produced by activation polarization where the current is of sufficient magnitude to protect cathodically the casing 11 against corrosion. Cathodic concentration polarization will produce a different shaped curve but this curve can be interpreted to obtain cathodic protection currents by those skilled in the art. The curvature 24 indicates the change of environment within casing 11 where the dissolution of iron still proceeds but is being rapidly diminished in magnitude. The intercept of the straight portion 23 with the curvature 24 is at a region 26 of cathodic reaction only of a system undergoing activation polarization. The current at the region 26 is only slightly more than 4.0 amperes and is the minimum current required for cathodically protecting the casing 11. Such current applied to the casing 11 provides a current density which exceeds the current density equivalent to the corrosion rate. Any current in excess of this amount would be dissipated without further increasing the cathodic protection of the casing 11. Suitable cathodic protecting anodes can be connected to the casing 11 to provide the desired current flow of slightly over 4.0 amperes. By this means, the casing 11 is adequately protected against corrosion without economic waste by using an excess amount of cathodic current. It will be noted that the potentials measured with the meter 21 for the curve A were in the range between 0.75 and 0.85 volt for about ten current increases, each of 0.4 ampere.

Figure 2:
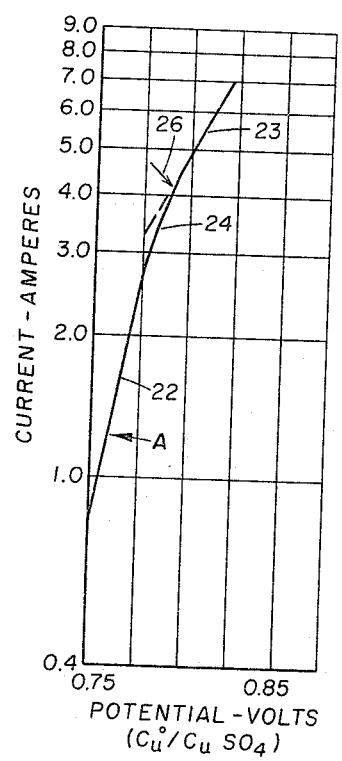
FIGURE 2 is a graph illustrating a curve produced by the polarization curve method.

The potential measured with the meter 21 must be accurate to at least 2 millivolts in order to produce curve A from which the optimum amount of current required to protect cathodically the casing 11 can be determined. This potential measurement with the meter 21 must be accomplished at substantially no current flow between the casing 11 and the reference electrode 18. Any significant current flow would disrupt the polarization effects in the casing 11. Thus, an accurate curve A, as shown in FIGURE 2, and the minimum correct cathodic current could not be obtained.

After a well casing has been protected for a sufficient length of time, for example 6 months, the polarization curve method may be repeated to insure continued cathodic protection. For this purpose, the meter 21 must produce reproducible measurements of the potential between the casing 11 and the reference electrode 18.

Figure 3:
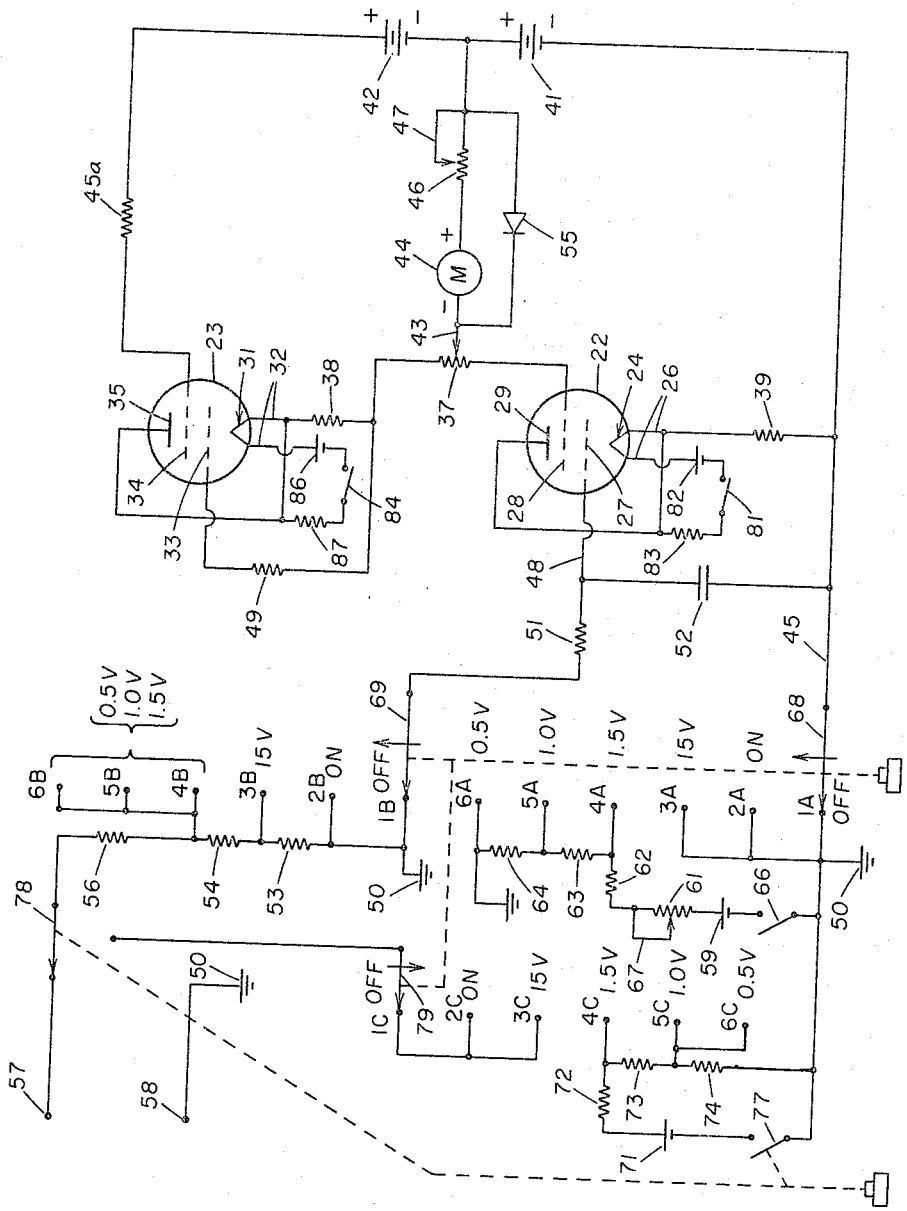
FIGURE 3 is a circuit diagram of a preferred embodiment of the present invention.

Referring now to FIGURE 3, a detailed description of the meter 21 of this invention will be given. The meter 21 comprises an electronic bridge with first and second electron discharge devices, each of which has a plate, screen grid, grid and cathode. The devices are connected in series with a resistance between the cathode of the first device and the screen grid of the other device, and a circuit including a source of anode voltage between the screen grid of the first device and the cathode of the other device. A utilization device for providing a readout is connected between the resistance and the anode voltage source. An input circuit to receive the voltage to be measured is connected between the grid and cathode of one of said electron discharge devices and a compensating circuit is connected between the grid and cathode of the other of said electron discharge devices.

More particularly, the meter 21, as shown in FIGURE 3, has like vacuum tubes 22 and 23 connected in series. The tube 22 may be any electron discharge device which has at least a cathode 24 (which may be a filament 26), a grid 27, a screen grid 28 and a plate 29. Similarly, the tube 23 has at least a cathode 31 (which may be a filament 32), a grid 33, a screen grid 34 and a plate 35. A resistance connects the cathode of one tube and the screen grid of the other tube. For example, a resistance 37 connects the cathode 31 of the tube 23 with the screen grid 28 of the tube 22. An additional resistance 38 connected between the resistance 37 and the cathode 31 provides a bias voltage to the grid 33 of the tube 23. A circuit including a source of anode voltage connects the cathode of the tube having the resistance 37 connected to its screen grid and the screen grid of the other tube. For example, such circuit comprises a means of high impedance interconnecting the cathode 24 of the tube 22 through a battery 41, a battery 42, and a resistance 45a with the screen grid 34 of the tube 23. A resistance 39 connected between the battery 41 and cathode 24 provides a bias voltage to the grid 27 of the tube 22. The batteries 41 and 42 are connected in series with their negative terminals directed toward the cathode 24 of the tube 22 and with their positive terminals directed toward the screen 34 of the tube 23. The resistance 45a assists in balancing the current flows through the last mentioned circuit interconnecting the tubes 23 and 24 when operated under the same conditions. A utilization device connects the junction of the batteries 41 and 42 with a point on the resistance 37 through a variable arm 43, or the like. The utilization device may be of any type capable of providing a readout proportional to current flow through such device between the junction of the batteries 41 and 42 and the resistance 37.

Thus, a change in operating conditions of one of the tubes 22 and 23 will cause an unbalance in the described circuitry to produce a readout in the utilization device proportional to the unbalance.

In the meter 21 shown in FIGURE 3, the utilization device includes a sensitive ammeter 44. The ammeter 44 preferably has a suspension system of the taut-band type. This type of suspension is freer of friction than the conventional jeweled movement. The ammeter 44 connects between the arm 43 of the resistance 37 and through a resistance 46 to the junction of the batteries 41 and 42. A variable arm 47 is provided the resistance 46 for purposes of exactly calibrating the ammeter 44 in the operation of the meter 21 of this invention. A diode 55 may be connected between the arm 43 and the junction of the batteries 41 and 42 for limiting current flows in only the direction normally registering a readout on the ammeter 44. The diode 55 protects the ammeter 44 in the event of counterdirectional current flow which might damage its construction.

The ammeter 44 is brought to a base line readout by adjusting the arm 43 on the resistance 37 when the tubes 22 and 23 are operating under substantially the same grid voltage conditions. The base line readout may be zero or full scale depending upon whether the unbalancing of the mentioned circuitry in proportion increases or decreases current flow through the ammeter 44. Further, the ammeter 44 is calibrated for exact readouts proportional to current flow therethrough between the zero and full scale deflection by adjusting the arm 47 on the resistance 46.

An input circuit of high impedance, preferably about 40 megohms, is connected between the grid and cathode of one of the tubes 22 and 23 to receive the unknown D.C. polarization voltage without any significant current flows. For example, the input circuit connects with the grid 27 and the cathode 24 of the tube 22. The input circuit has one conductor 45 which connects with the resistance 39 and the negative terminal of the battery 41. The input circuit has another conductor 48 which connects with the grid 27 of the tube 22. The other extremities of the conductors 48 and 45 terminate at the input terminals 57 and 58, respectively, as seen in FIGURES 1 and 3. It is noted that the terminal 58 is connected to a common ground 50 as are other portions of the circuitry of the meter 21. Obviously, a single conductor could be substituted for the common connection provided by the ground 50 with facility and equal results. Thus, the input circuit is connectable at will in series with the casing 11 and the reference electrode 18 through the switch 17. By this arrangement, the unknown D.C. polarized voltage present between the casing 11 and the electrode 18 is applied through the input circuit between the grid 27 and the cathode 24 of the tube 22. The input circuit has a bias means provided by the resistance 39 sufficient to place the tube 22 at an operating point on a portion of its grid voltage-plate current curve where the grid 27 never becomes positive throughout the range of unknown D.C. voltages to be measured by the meter 21.

A compensating circuit is connected between the grid and cathode of the tube not connected to the input circuit. The compensating circuit provides for the biasing of such tube to an operating point at one end of the mentioned portion of the grid voltage-plate current curve with either a minimum or maximum unknown D.C. voltage to be measured applied to the input circuit. Thus, the like tubes 22 and 23 operate under identical conditions at such one point on the mentioned curve. The tube connected to the input circuit will operate responsively to the applied unknown D.C. voltage along the portion of the mentioned curve away from such one point. For example, a compensating circuit is connected between the grid 33 and the cathode 31 of the tube 23. The connection to the cathode 31 is at the juncture of the resistance 37 with the resistance 38. Such compensating circuit includes a resistance 49. The resistance 49, in conjunction with the resistance 38, provides suitable grid bias voltage to the grid 33 so that the tubes 22 and 23 operate at the same one point of the mentioned curve at one extreme of the range of unknown D.C. voltage applied to the input circuit.

As mentioned, the tube 22 is placed at an operating point at one end of a portion of the grid voltage-plate current curve with either a minimum or maximum unknown D.C. voltage applied to the input circuit for providing either a zero or full scale readout on the ammeter 44. The polarity of the unknown D.C. voltage applied to the input circuit is determinative as to whether the ammeter 44 provides a zero or full scale readout for a minimum or maximum D.C. voltage.

The input circuit has a very high impedance, preferably about 40 megohms. For this result, a plurality of resistances are connected in series with the conductor 48. More particularly, a resistance 51 in series with the conductor 48 and a capacitance 52 in shunt between the grid 27 and the cathode 24 of the tube 22 increase the impedance of the input circuit and also form a filter for removing alternating current components present in the unknown D.C. voltage applied between the terminals 57 and 58. More particularly, resistances 53, 54, and 56 connected in series with the resistance 51 in the conductor 48 further increase the impedance of the input circuit. The total impedance of the resistances 51, 53, 54, and 56, the capacitance 52 and the tube 22 itself provide an impedance in the input circuit between its input terminals 57 and 58 of about 40 megohms. Thus, no significant current flows in the input circuit when the meter 21 is used to measure the polarization potential between the casing 11 and the reference electrode 18.

The current needed to protect ferrous well casings, or the like, can be determined without forcing the potential above 1.5 volts referred to a reference electrode of copper-copper sulfate. Thus, the range of the meter 21, for this cathodic protection usage, need not be greater than from zero to 1.5 volts, disregarding the polarity thereof. For convenience, and to secure optimum readout accuracy on the ammeter 44, the basic range of the meter 21 may be a fraction of such voltage with means to extend such range by integral multiples of a given magnitude of voltage. For example, the basic range of the meter 21 by construction can be between zero and 0.5 volt D.C. applied to the input circuit for the ammeter 44 to produce a proportionate zero to 0.5 volt D.C. readout with a readout accuracy of ±2.0 millivolts. In the meter 21, suppression voltage is used to extend the basic range of measurable D.C. voltages. For example, in the present embodiment in meter 21, its basic range is zero to 0.5 volt D.C., and extended ranges are 0.5 to 1.0 volt D.C. and 1.0 to 1.5 volts D.C. Other basic ranges and extended ranges may be used if desired. For this purpose, means are connected to the input circuit for providing one or more suppression voltages to the grid of the tube connected thereto. The suppression voltage, at each application, has a magnitude sufficient to maintain the operating point of the tube connected to the input circuit on the same portion of the mentioned curve for extending, by the suppression voltage, the magnitude of unknown voltage to be measured. For example, the range of unknown voltage for the meter 21 has been described as zero to 0.5 volt while maintaining the operating point of the tube 22 on a portion of the mentioned curve. A suppression voltage applied to the grid 27 of 0.5 volt, of opposite polarity to the unknown voltage, will allow the measurement of unknown voltages of 0.5 to 1.0 volt D.C. with the ammeter 44 producing its usual readout from zero to 0.5 volt D.C. It will be apparent that the unknown D.C. voltage is reduced in the input circuit by 0.5 volt. By application of suppression voltages successively increased by 0.5 volt, the basic range of zero to 0.5 volt may be extended for measurement of any desired magnitude of unknown D.C. voltage in the input circuit in 0.5 volt increments. Thus, the tube 22 operates linearly over a small portion of the mentioned curve. However, the meter 21 responds only to its basic range of zero to 0.5 volt D.C. applied to the input circuit and therefore maintains the same accuracy and reproducibility without regard to the actual magnitude of the applied unknown D.C. voltage. Only the suppression voltage has been varied by a known magnitude.

A source of suppression voltage in such means may be comprised of a battery 59, resistances 61, 62, 63, and 64 connected in series through a switch 66 for selectively completing the circuit to the ground 50. The resistance 61 may be provided with a variable arm 67 for calibration purposes, which purposes hereinafter will be more fully described. A plurality of terminals 1A through 6A connected with the resistances 63 and 64 are used to provide suppression voltages in 0.5 volt increments. A single-throw 6-pole switch 68, for selectively connecting the terminals 1A through 6A with the conductor 45, provides a means to apply suppression voltages to the input circuit. The positions of the switch 68 at each terminal are marked with the operative function of the meter 21 at such position. More particularly, these suppression voltages are applied between the cathode 24 and the grid 27 of the tube 22. The terminals 5A and 4A provide suppression voltages between the terminal 58 (ground 50) and the conductor 45 of 0.5 and 1.0 volt D.C., respectively. The terminal 6A connects with ground 50 and may be considered as zero suppression voltage. The terminals 3A, 2A and 1A are not incldued as suppression voltage sources but connect with ground 50 to provide continuity of the conductor 45 to the terminal 58 when no suppression voltages are needed. The source of suppression voltage is of low impedance to provide the small suppression voltages. As a result, no change in the impedance of the input circuit to effect the operation of the meter 21 is produced when such voltages are inserted into the input circuit connected between the cathode 24 and the grid 27 of the tube 22. More particularly, by operation of the switch 68, the range of voltage measurable at the input terminals 57 and 58 may be varied by connection to the terminals 6A, 5A and 4A in increments of 0.5 volt D.C. However, only the unknown D.C. voltage in excess of the suppression voltage appears at the grid 27 of the tube 22. Under these circumstances, the ammeter 44 always produces a readout over the basic range of the meter 21, that is, zero to 0.5 volt D.C. Thus, the range of the meter 21 is varied in 0.5 volt increments while the ammeter 44 produces a readout over zero to 0.5 volt D.C.

More particularly, with an unknown D.C. voltage between zero and 0.5 volt D.C. applied to the input terminals 57 and 58, the switch 68 is operated to connect the conductor 45 with terminal 6A. This is the basic range of the meter 21. The meter 21 produces a linear readout from zero to 0.5 volt in the ammeter 44 proportionate to the D.C. voltage between zero and 0.5 volt applied to the input terminals 57 and 58. With an unknown D.C. voltage applied across terminals 57 and 58 of a magnitude between 0.5 and 1.0 volt, the switch 68 is operated to connect the conductor 45 with the terminal 5A. A suppression voltage of 0.5 volt D.C. is applied through the input circuit to the grid 27 of the tube 22. Thus, the meter 21 will produce a linear readout from zero to 0.5 volt in the ammeter 44 proportionate to the D.C. voltage between 0.5 and 1.0 volt applied to the terminals 57 and 58. Thus the tubes 22 and 23, and the associated circuitry, are measuring a voltage between zero and 0.5 volt D.C. as was the case in the basic range of the meter 21. With an unknown voltage of between 1.0 and 1.5 volts applied to the input terminals 57 and 58, the switch 68 is operated to connect the conductor 45 with terminal 4A. A suppression voltage of 1.0 volt D.C. is applied through the input circuit to the grid 27 of the tube 22. Thus, the meter 21 produces a linear readout from zero to 0.5 volt in the ammeter 44 proportionate to the D.C. voltage between 1.0 and 1.5 volts applied to terminals 57 and 58. The advantages of such arrangement are obvious. For measurement of any unknown D.C. voltage applied to the input terminals 57 and 58 of the meter 21, the tubes 22 and 23 are operated under the identical conditions as exist with the measurement of a voltage between zero and 0.5 volt D.C. at the input terminals 57 and 58. A linear response in the readout of the ammeter 44 and a uniform sensitivity is maintained throughout the entire range of unknown D.C. voltages to be encountered in the field. This, as a result, provides that the measurement of several voltages (regardless of magnitude) may be accomplished with the same sensitivity and reproducibility in the meter 21. The basic range of the meter 21 may be other than from zero to 0.5 volt D.C. and other magnitudes of suppression voltage may be used, if desired.

Voltages higher than 1.5 volts, or above the range of suppression voltage increases, may be measured across a lesser impedance of a voltage divider since the accuracy of such measured voltage need not be as great as when making measurements for a polarization curve. For example, in many instances it is desirable to first measure the relative magnitude of voltage between the casing 11 and the reference electrode 18 in order to prevent the application of a greatly excessive voltage to the meter 21, to determine which lower range of voltage measurement is to be employed or for other reasons. A selective switching of impedance in the input circuit for voltage measurements is provided by a switch 69. The switch 69 is arranged to selectively connect the resistance 51 with a plurality of terminals 1B, 2B, 3B, 4B, 5B and 6B. The positions of the switch 69 at the terminals are marked as to their operative functions in the meter 21, the same as described for the switch 68. The terminals 4B, 5B and 6B are connected to the juncture between the resistances 54 and 56. More particularly, the terminals 4B, 5B and 6B are connected together for the measurement of the ranges of voltage; zero to 0.5 volt, 0.5 volt to 1.0 volt, and 1.0 volt to 1.5 volts D.C. The input circuit, between terminals 57 and 58, has an impedance of 40 megohms with connection by switch 69 of the resistance 51 to the terminals 4A, 5A and 6A. The switch 69 selectively connects the resistance 51 to the terminal 3B and the juncture of resistances 53 and 54 in the meter 21 when measuring voltages above 1.5 volts D.C. The resistance 53, and resistances 54 and 56, have a relationship as a voltage divider such that any voltage between zero and 15 volts D.C. applied between the terminals 57 and 58 produces a substantially proportionate readout between zero and 0.5 volt D.C. in the ammeter 44. This readout is not linear as when exact suppression voltages are used to extend the range of the meter 21. A voltage divider network is not suitable for use in extending polarization voltages with the necessary accuracy for measurement in the meter 21. The switch 69 selectively connects the resistance 51 to the terminal 2B and ground 50 so that the ammeter 44 may be balanced and calibrated through the use of standardization means which will be now described.

The standardization means are comprised of a circuit which includes a standard reference battery or cell 71 in a series circuit to ground 50 including a plurality of resistances 72, 73 and 74. These resistances are selectively connected to the standard cell 71 by a switch 77. The switch 77 mechanically interconnects with a switch 78 in the input circuit. The conductor 48 and resistances 51, 53, 54 and 56 may be selectively connected to the standardization means or the terminal 57 through the switch 78. The current from the battery 71 flows through the resistances 72, 73 and 74 when the switch 77 is closed, providing, respectively, the following standard voltages across the resistances: 0.5 volt and 1.0 volt. A single-pole multithrow switch 79 selectively interconnects the input circuit from the switch 78 to terminals 1C, 2C, 3C, 4C, 5C and 6C. The positions of the switch 79 at the terminals are marked as to their function in the operation of the meter 21, the same as described for switches 68 and 69. The standard voltages are applied to the input circuit in the following manner. The juncture of resistances 72 and 73 is connected to terminal 4C to provide a standard voltage of 1.0 volt between terminal 4C and the conductor 45. The juncture of resistances 73 and 74 is connected to terminal 5C to provide a standard voltage of 0.5 volt between terminal 5C and the conductor 45. The juncture of resistances 73 and 74 also is connected to terminal 6C to provide a standard voltage of 0.5 volt between terminal 6C and the conductor 45. The terminals 1C, 2C and 3C are not connected to the standardizing battery and resistances previously mentioned but are left "floating." Preferably, a mechanical interconnection between the switches 68, 69 and 79 is provided so that they operate in synchronism. This arrangement provides for applying a standard voltage for calibrating the meter 21 in each voltage range below 1.5 volts with the same input impedance. Thus, the meter 21 can be calibrated in exactly the same condition as used for measuring unknown voltages. It is noted that no calibration for the zero to 15 volt-range is provided since at this range extreme accuracy is not required. Obviously, the "off" position and the "on" or warm-up position do not require standardization or suppression voltages.

The meter 21 is operated in the following manner. The switches 68, 69 and 79 are in "off" position. Filament voltage is applied to the filament 26 of the tube 22 by means of a filament circuit which includes a switch 81, a battery 82 and a current-limiting resistance 83. Filament voltage is applied to the filament 32 of the tube 23 by means of a filament circuit which includes a switch 84, a battery 86 and a current-limiting resistance 87. The switches 68, 69 and 79 are placed in the "on" position in interconnection with the terminals 2A, 2B and 2C operatively connectable thereto, respectively, after the tubes 22 and 23 are at an operating temperature. The switch 78 is operated to interconnect the input circuit to the terminal 57. The switch 66 is closed to provide suppression voltages. Next, the switches 68, 69 and 79 are positioned to interconnect with the terminals 6A, 6B and 6C connected thereto, respectively. Preferably, the input terminals 57 and 58 at this time are short-circuited. The arm 43 on the resistance 37 is adjusted until the ammeter 44 reads at a zero scale position. The current flow between the tubes 22 and 23 from the batteries 41 and 42 is now balanced. The switch 77 is then closed to provide standardizing voltages at terminals 4C, 5C and 6C. The switch 78 is operated to interconnect the input circuit via the conductor 48 with the standardizing means at the terminal 6C through the switch 79. A standardizing voltage of 0.5 volt D.C. at the terminal 6C is applied to the input circuit. The arm 47 on the resistance 46 is adjusted to provide a fullscale readout of 0.5 volt D.C. on the ammeter 44. Now the meter 21 has been adjusted for proper operation in the range of zero to 0.5 volt applied between the terminals 57 and 58 when properly interconnected thereto by the switch 78. Uusually it is desirable to complete the calibration of the meter 21 for the other ranges at this time. For this purpose the switches 68, 69 and 79 are adjusted to interconnect with the terminals 5A, 5B and 5C connectable thereto, respectively. A suppression voltage of 0.5 volt from the terminal 5A is now applied from the suppression voltage means to the conductor 45 of the input circuit through the switch 68. With the switches 77 and 78 still closed, a standardizing voltage at terminal 5C of 0.5 volt is applied to the input circuit. The arm 67 on the resistance 61 is adjusted to produce a zero scale readout on the ammeter 44. It will be remembered that in this range the zero scale readout is 0.5 volt and the full scale readout is 1.0 volt as applied between the input terminals 57 and 58. Next, the switches 68, 69 and 79 are adjusted to interconnect with the terminals 4A, 4B and 4C connectable thereto, respectively. A suppression voltage at the terminal 4A of 1.0 volt is applied between the input circuit and the conductor 45. The standardizing voltage at terminal 4C is applied to the input circuit. With the switch 77 closed, the ammeter 44 should produce a zero scale readout. If it does not, then the preceding steps should be repeated. In this range the zero scale readout is 1.0 volt and the full scale readout is 1.5 volts, D.C. Thus, the meter 21 has been calibrated to provide a linear readout of zero to 0.5 volt on the ammeter 44 through each of the ranges of unknown D.C. voltages from zero to 0.5 volt, 0.5 volt to 1.0 volt, and 1.0 volt to 1.5 volts, D.C., to be applied to the input circuit at the terminals 57 and 58. The meter 21 is now calibrated and adjusted for measurement of unknown D.C. polarization voltages.

The procedure for measuring polarization voltages is as follows. The switches 68, 69 and 71 are set to connect with the terminals 3A, 3B and 3C, respectively. The switch 78 is adjusted to connect the conductor 48 of the input circuit with the terminal 57 and the switch 77 is opened. The terminals 57 and 58 are connected to the casing 11 and reference electrode 18, respectively. The unknown voltage applied between the terminals 57 and 58 produces a readout on the ammeter 44 having a scale range of zero to 15 volts D.C. The accuracy of the readout is not sufficient for purposes of determining the amount of the cathodic current needed to protect the casing 11, but will give an indication of the proper range of voltage to be measured. For example, assume the voltage to be 0.75 volt. For this purpose, the switches 68, 69 and 79 are set to connect with the terminals 5A, 5B and 5C, respectively. The voltage of 0.75 volt applied to the terminals 57 and 58 will produce a linear readout in the ammeter 44 of 0.250 volt on its scale of zero to 0.5 volt. However, it is to be remembered that a suppression voltage of 0.5 volt has been applied to the input circuit. Thus, to each scale readout of the ammeter 44 must be added 0.5 volt. The unknown D.C. voltage is 0.250+0.500 volt or 0.750 volt. Preferably, the meter 21 is provided with scales of: zero to 0.5, 0.5 to 1.0 and 1.0 to 1.5 volts for direct readout unknown voltages.

Thus, it will be apparent that voltages in any range normally encountered in the determination of cathodic current requirements for protecting wells may be readily determined. More particularly, it will be remembered that these voltages can be measured with the same sensitivity and readout ability on the ammeter 44 as over the basic range of zero to 0.5 volt in the meter 21. This is a necessary requirement for producing accurate plots of the curve A shown in FIGURE 2 for determining the minimum necessary cathodic current. For example, referring to FIGURE 2, the region 26 indicates the minimum cathodic current required to protect the well casing 11 although greater amounts of cathodic current can be utilized. However, the supplying of protective cathodic currents in the field is relatively expensive and economic waste results in using currents greater than that indicated by the region 26 of the curve plotted in FIGURE 2. For this reason, it is apparent that the great utility of the meter 21 is in providing accurate determinations of the cathodic requirements for protecting well casings in the field. No excess cathodic current need be provided to safeguard against inaccuracies in current requirement determinations.

It will be remembered that the screen grids 28 and 34 of the tubes 22 and 23 are used as their anodes. The plates 29 and 35 of the tubes 22 and 23, respectively, may be left floating or connected to the cathodes of the respective tubes. However, for best results in the procedures of applying the polarization curve method, as described, the plates 29 and 35 should not be connected as the anodes of the tubes 22 and 23 nor connected to the screen grids 28 and 34. It was found that when the plates 29 and 35 of the tubes 22 and 23, respectively, were connected as anodes in the meter 21, the readout on the ammeter 44 was not linear. For example, the scale readout of the ammeter 44 set forth in the following Table I for several D.C. voltages applied to the input circuit illustrates the nonlinear readout produced when the plates 29 and 35 were connected as anodes for the tubes 22 and 23.

TABLE I.—AMMETER 44 READOUT SCALE 0–0.5 VOLT D.C.

| Actual Readout | Linear Readout | Error, Percent of Linear Scale Readout |
|---|---|---|
| 0.100 | 0.104 | 3.85 |
| 0.200 | 0.206 | 2.91 |
| 0.300 | 0.304 | 1.32 |
| 0.400 | 0.404 | 0.99 |
| 0.500 | 0.500 | --------------- |

When the plates 29 and 35 are connected as shown in the FIGURE 3, or left floating, with the screen grids 28 and 34 connected as the anodes of the tubes 22 and 23, respectively, the readout on the ammeter 44 is linear; i.e., directly proportional to the D.C. voltage applied to the input circuit. The reason for this advantageous result is not known with certainty.

From the foregoing, it will be apparent that there has been provided a cathodic current meter well suitable for use in the field to determine the minimum amount of cathodic current needed to protect well casings. More particularly, this meter has great sensitivity, uniform reproducibility, and produces a linear readout over the basic range of the meter and the range as extended by suppression voltages. The meter 21 is constructed of readily available electronic parts.

The foregoing description is intended to be taken as a means of illustration and not as a means of limitation to the present invention. Various changes and alterations may be made to the disclosed invention without departing from its scope as will be apparent to those skilled in the art. It is intended that such changes and alterations be encompassed within the scope of the appended claims and that these claims provide the only limitations to the invention.

What is claimed is:
1. A meter comprising:
   (a) first and second electron tubes, each tube having a plate, a screen grid, a grid and a cathode,
   (b) a circuit including a source of anode voltage connected between the screen grid of the first tube and the cathode of the second tube,
   (c) a resistance connected between the cathode of the first tube and the screen grid of the second tube,
   (d) a utilization device providing a readout proportional to current flow therethrough, the utilization device connected between a point on the resistance and the anode voltage source, and
   (e) an input circuit of high impedance to receive a D.C. voltage to be measured, said input circuit connected between the grid and cathode of one of said first and second tubes and a compensating circuit connected between the grid and cathode of the other of said first and second tubes, the input circuit having a biasing means to operate the tube connected to said input circuit on a portion of its grid voltage-plate current curve with the unknown D.C. voltage to be measured applied to the input circuit, and the compensating circuit including means for biasing the tube connected thereto to operate on the same portion of the mentioned curve as the other tube.

2. The meter of claim 1 wherein means are connected to the input circuit providing a suppression voltage to the grid of the tube connected thereto, said suppression voltage having a magnitude sufficient to maintain the operation of said tube connected to the input circuit on the same portion of the mentioned curve for extending by the suppression voltage the magnitude of unknown D.C. voltage to be measured.

3. The meter of claim 1 wherein means are connected to the input circuit for applying a plurality of suppression voltages to the grid of the tube connected thereto, said suppression voltages having successively great magnitudes in integral multiples for extending by each of the suppression voltages the magnitude of the unknown D.C. voltage to be measured.

4. A meter comprising:
   (a) first and second electron tubes, each tube having a plate, a screen grid, a grid and a cathode,
   (b) a circuit including a source of anode voltage connected between the cathode of the first tube and the screen grid of the second tube,
   (c) a resistance connected between the cathode of the second tube and the screen grid of the first tube,
   (d) an input circuit of high impedance to receive a D.C. voltage to be measured connected between the grid and cathode of one of the first and second tubes, said circuit having a biasing means to operate said tube on a portion of the grid voltage-plate current curve with any D.C. voltage in the range between minimum and maximum D.C. voltages to be measured applied to the input circuit,
   (e) a compensating circuit connected between the grid and cathode of the other of said tubes not connected to the input circuit, said circuit including means for biasing said tube to operate at one end of said portion of the mentioned curve when either a minimum or maximum unknown D.C. voltage to be measured is applied to the input circuit, and
   (f) a utilization device connected between a point on the resistance and the source of anode voltage, said utilization device providing a readout proportional to the current flow therethrough responsive to a D.C. voltage applied to the input circuit.

5. The meter of claim 4 wherein means are connected to the input circuit providing a suppression voltage to the grid of the tube connected thereto, said suppression voltage having a magnitude sufficient to maintain the operation of said tube connected to the input circuit on the same portion of the mentioned curve for extending by the suppression voltage the magnitude of unknown D.C. voltage to be measured.

6. The meter of claim 4 wherein means are connected to the input circuit for applying a plurality of suppression voltages to the grid of the tube connected thereto, said suppression voltages having successively great magnitudes in integral multiples for extending by each of the suppression voltages the magnitude of the unknown D.C. voltage to be measured.

7. A meter comprising:
   (a) first and second electron discharge devices, each device having a plate, screen grid, grid and cathode,
   (b) a resistance connected between the cathode of the first device and the screen grid of the second device,
   (c) a circuit including a source of anode voltage connected between the screen grid of the first device and the cathode of the second device,
   (d) a utilization device providing a readout connected between the resistance and the anode voltage source, and
   (e) an input circuit connected between the grid and cathode of one of said devices and a compensating circuit connected between the grid and cathode of the other of said devices.

8. A meter comprising:
   (a) a pair of like electron discharge devices each of which has a plate, screen grid, grid and cathode,
   (b) circuit means connecting the devices in series with the screen grid and cathode of one device connected to the cathode and screen grid, respectively, of the other device, said circuit means including a source of anode voltage, (c) a utilization device connected with said circuit means providing a readout responsive to a differential current flow between said devices, and (d) an input circuit connected between the grid and cathode of one of said devices to receive an unknown D.C. voltage to be measured and a compensating circuit connected between the grid and cathode of the other of said devices for providing equal grid currents in the electron discharge devices with at least one magnitude of D.C. voltage applied to the input circuit.

9. A meter comprising:

(a) a pair of like electron discharge devices each of which has a plate, screen grid, grid and cathode, (b) circuit means connecting the devices in series with the screen grid and cathode of one device connected to the cathode and screen grid, respectively, of the other device, said circuit means including a source of anode voltage, (c) a utilization device connected with said circuit means providing a readout responsive to a differential current flow between said electron discharge devices, (d) an input circuit connected between the grid and cathode of one of said electron discharge devices to receive an unknown D.C. voltage to be measured and a compensating circuit connected between the grid and cathode of the other of said electron discharge devices for providing equal grid currents in the electron discharge devices with at least one magnitude of D.C. voltage applied to the input circuit, (e) means of low impedance connected in the input circuit providing at least one suppression voltage to the grid of the electron discharge device connected to the input circuit, each said suppression voltage having a magnitude to reduce the magnitude of the unknown D.C. voltage sufficiently to permit the utilization device to provide a readout.

10. The meter of claim 9 wherein each suppression voltage has a magnitude greater by integral multiples than the suppression voltage required to produce a reduction in readout proportionate to the maximum to minimum unknown D.C. voltages applied to the input circuit without any suppression voltage.

References Cited
UNITED STATES PATENTS

| | | | |
|---|---|---|---|
| 2,490,167 | 12/1949 | Storm | 324—101 |
| 2,526,857 | 10/1950 | Chaney | 324—123 X |
| 2,806,208 | 9/1957 | Giuffrida | 324—123 |
| 2,863,118 | 12/1958 | Pihl | 330—146 X |

WALTER L. CARLSON, *Primary Examiner.*

J. J. MULROONEY, *Assistant Examiner.*